No. 846,049. PATENTED MAR. 5, 1907.
C. PEARSON.
CORN PICKER AND HUSKER.
APPLICATION FILED JAN. 5, 1907.
2 SHEETS—SHEET 1.
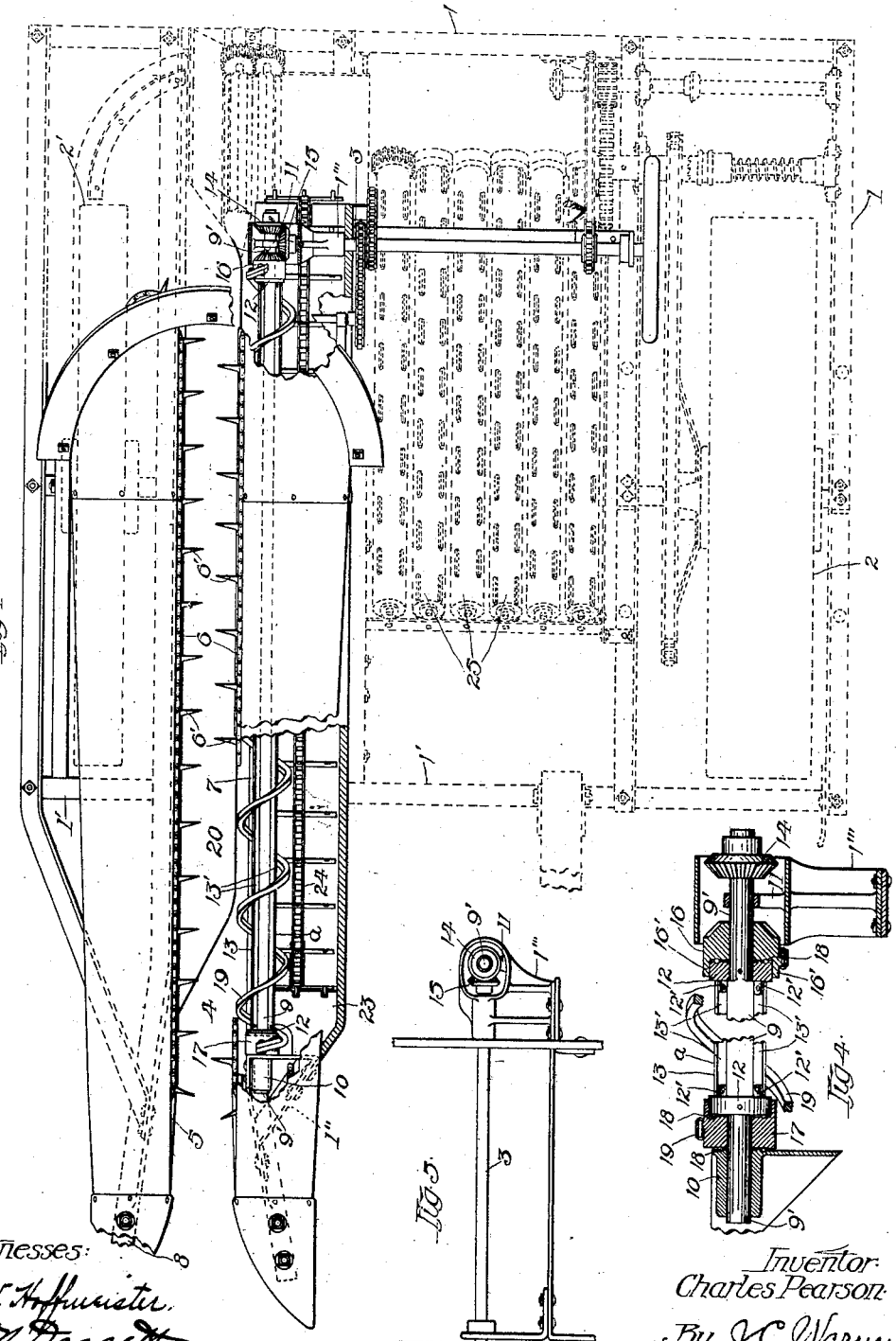
Witnesses:
J. W. Hoffmeister
J. M. Daggett
Inventor:
Charles Pearson
By J. C. Warner,
Attorney

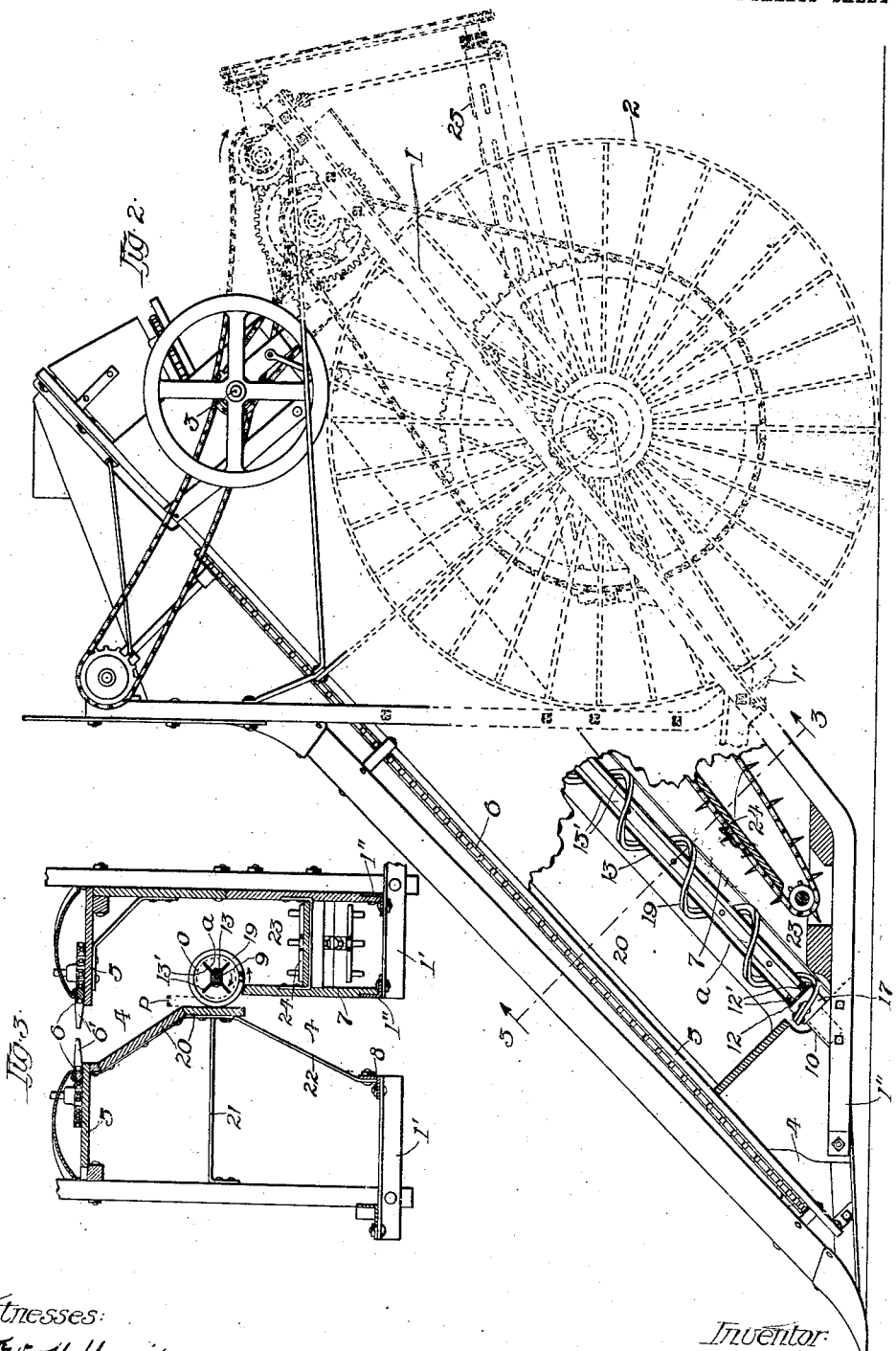

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

CORN PICKER AND HUSKER.

No. 846,049.      Specification of Letters Patent.      Patented March 5, 1907.

Application filed January 5, 1907. Serial No. 350,866.

*To all whom it may concern:*

Be it known that I, CHARLES PEARSON, a citizen of the United States, residing at Chicago, in the county of Cook and State of Illinois, have invented a new and useful Improvement in Corn Pickers and Huskers, of which the following is a complete specification.

This invention relates to the class of machines employed in picking and husking corn in the field, and more particularly to the snapping-roll and other coöperating members which have to do with the removal of the ears from the stalks preparatory to their being husked.

The object in view is to produce a cheap, light-running, and efficient ear-removing device, one requiring the minimum amount of power to operate and one which is comparatively free from the faults of excessive shelling and ear crushing.

Referring to the accompanying drawings, Figure 1 is a plan view of a corn picker and husker, the parts not directly associated with the ear-snapping members being shown in light dotted lines, while a portion of one side of the upper forward end of the picker-frame is broken away in order to disclose the construction and arrangement of the snapping-roll and coöperating elements. Fig. 2 represents an elevation of the stubble side of the machine with parts broken away, some of the non-essential parts in this view being shown in dotted lines. Fig. 3 is a transverse section through the gathering and snapping mechanism, the view being taken on the line 3 3 of Fig. 2. Fig. 4 is a detail showing a longitudinal section of the snapping-roll, and Fig. 5 is a detail showing in rear elevation the bracket and bearing for the upper end of the snapping-roll.

In the drawings, 1 designates the main frame, 2 the main supporting and driving wheel, and 2' the grain-side supporting-wheel, these wheels being shown in dotted lines. Suitably mounted on the machine-frame 1 is the cross-shaft 3, which is driven from the main wheel through operative driving connections therewith. As the interposed driving mechanism constitutes no part of the present invention, a detailed description of same is not deemed necessary. As is customary in such machines, the grain side of the main frame is divided to form a longitudinally-extending stalk passage-way 4. The lower edge of the board 7 and the angle-bar 8, which are secured to the frame members 1' 1' and the gathering-boards 5 5, constitute the lower and the upper margins, respectively, of said passage-way. On the gathering-boards 5 are mounted the gathering-chains 6, having the fingers 6', which project inwardly across the stalk passage-way, the function of these chains and fingers being to advance the stalks through the passage-way.

Located, preferably, on the stubbleward side of the machine and substantially in line with the inner edges of the gathering-board 5 and the board 7, which forms one wall of the stalk passage-way, is the snapping-roll, (designated as a unit by $a$.) This snapping-roll inclines rearwardly and upwardly in the stalk passage-way and is constructed as follows: A square shaft 9, with its ends 9' turned round, journals below in the bracket 10, which is secured to the lower forward member 1'' of the main frame, and above in the bracket 11, which is fixed to the member 1''' of the main frame. Collars 12 are fixed to the shaft 9 on the round portion thereof and adjacent to the shoulders, each collar being provided with laterally-projecting lugs 12'. To the square portion of the shaft 9 and to the said lugs 12' are secured by rivets or otherwise the angle-bars 13, the angle-bars being oppositely disposed and arranged to form four radially-projecting blades, as clearly shown in Figs. 3 and 4. A bevel-pinion 14 is also fixed to the upper end of the shaft 9, this pinion meshing with and being driven by the bevel-pinion 15 on the end of the cross-shaft 3. On the round portion 9' of the shaft 9, above and adjacent to the fixed collar 12, is loosely sleeved the flanged bevel-pinion 16, the annular flange 16' thereon projecting down over the said collar. While this flange is not essential, it is preferred, since it strengthens the roll and prevents material collecting between the pinion and collar. The pinion 16 meshes with and is driven also by the pinion 15 on the shaft 3, but in a direction opposite with respect to the direction of rotation of the shaft 9. A second loose collar 17 sleeves on the round portion 9' of the shaft 9 below the lower fixed collar 12. Ball-bearings 18 are interposed between the pinion 16 and collar 12 and on each side of the loose collar 17. A helical stalk-advancing screw 19 surrounds the shaft 9 and the blades thereon, which together constitute the snapping-roll, the end of said screw being secured above to the flanged pinion 16 and below to the loose collar 17. This screw 19 is thus supported upon the snapping-roll and, it is evident, must rotate in a direction opposite with respect thereto. The said screw is formed of a square rod, the twist being such that one of the sides thereof as distinguished from a corner of the rod will be presented to the coöperating abutting surface in the stalk passage-way 4. The abutting surface referred to is formed by a board 20, which projects inwardly and downward from the grain side of the stalk passage-way 4 toward the said screw, the said board abutting the screw flatwise and extending parallel therewith. The forward end of said board is tapered, as shown, in order to deflect the cornstalks toward the screw and roll. The dotted circle o indicates the path of travel of the edges of the blades 13', formed by the anglebars 13, and the distance p between the periphery of the circle o and the abutmentboard 20 represents the extent of the contracted opening of the stalk passage-way at this point. Within this contracted space p of the stalk passage-way the helical screw 19 is made to operate, the screw being formed to present a flat surface both to the stalks operated upon and the board 20. As the size of the square rod forming the screw is such that it practically fills the space between the board 20 and snapping-roll a, the wedging of stalks at the side of the screw is effectually prevented. The abutment 20 projects downward and inwardly from the inner edge of the outer gathering-board 5 and is held rigidly in position by the bracerods 21 and 22. The snapping-roll a and the helical screw 19 move in directions as indicated by the arrows in Fig. 3. With other arrangement of the driving-gears for the screw and roll the screw might be made to move in the same direction as the roll; but the construction and direction of motion described is preferred for the reason that the screw operates on the top of the ear to bend it down and the roll acts upwardly on the butt-end, thereby producing a wrenching action on the ear and greatly increasing the efficiency of the roll. A trough 23 is located beneath and stubbleward of the snapping-roll a, and in the bottom of this trough is placed an ear-conveyer 24, which carries the corn upward and rearward to the husking-rolls 25. (Shown in dotted lines in Fig. 1.)

In operation the machine is made to advance upon the row of corn being gathered, the stalks entering the passage-way 4, where they are deflected by the forward end of the board 20 into engagement with the screw 19 and snapping-roll a. The screw advances the stalks through the passage-way, lifting them to an erect position, if necessary. The blades of the snapping-rolls will approach the ears, striking the butts thereof, and knock them from the stalks. The abutment-board 20 holds the stalks and ears in engagement with the roll and screw, and the screw not only advances the stalks, but also assists in removing the ears.

What I claim as my invention, and desire to secure by Letters Patent, is—

1. In a corn picker and husker, in combination, a snapping-roll, a helical stalk-advancing screw surrounding said roll and arranged to rotate in a path beyond the periphery thereof, and a fixed abutment located adjacent to said roll and screw and in a position to coöperate therewith.

2. In a corn picker and husker, in combination, a snapping-roll, a fixed abutment arranged parallel therewith and at a slight distance therefrom, said roll and abutment thus forming a stalk passage-way, and a helical stalk-advancing screw surrounding said snapping-roll and operating to advance the stalks through said passage-way.

3. In a corn picker and husker, in combination, a snapping-roll consisting of a square shaft having two oppositely-disposed anglebars arranged to form four radially-projecting blades, a helical stalk-advancing screw surrounding said roll and arranged to rotate in a path beyond the periphery thereof, and a fixed abutment located adjacent to said roll and screw and in a position to coöperate therewith.

4. In a corn picker and husker, in combination, a snapping-roll, a fixed abutment arranged parallel therewith and at a slight distance therefrom, said roll and abutment thus forming a stalk passage-way, and a helical stalk-advancing screw surrounding said snapping-roll and operating to advance the stalks through the passage-way, said screw being formed of a square rod, with one of the sides thereof constituting the abutment-engaging surface.

5. In a corn picker and husker, in combination, a snapping-roll, a helical stalk-advancing screw supported on and surrounding said roll and arranged to rotate oppositely with respect to the direction of rotation thereof, and a fixed abutment located adjacent to said roll and screw and in a position to coöperate therewith.

6. In a corn picker and husker, in combination, a snapping-roll comprising a square shaft having its ends round, collars fixed thereto and near the ends thereof, and oppositely and longitudinally disposed angle-bars secured to said shaft and collars and arranged to form four radially-projecting blades, a bevel-pinion fixed to the upper end of said square shaft, an opposing flanged bevel-pinion loosely mounted also on the upper end of the square shaft, a driving-pinion meshing with the before-mentioned pinions and imparting motion thereto in opposite directions, a loose collar on the lower end of the square shaft, a helical stalk-advancing screw surrounding the snapping-roll, said screw fixed at its upper end to the said flanged bevel-pinion and below to the said loose collar, and a fixed abutment located adjacent to said roll and screw and in a position to coöperate therewith.

CHARLES PEARSON.

Witnesses:
RAY PATTISON,
WILLIAM WEBBER.